(12) United States Patent
Jin et al.

(10) Patent No.: US 8,718,560 B2
(45) Date of Patent: May 6, 2014

(54) DYNAMIC CLEAR CHANNEL ASSESSMENT USING SPECTRUM INTELLIGENT INTERFERENCE NULLING

(75) Inventors: Hang Jin, Plano, TX (US); Li Guo, Irving, TX (US); Paul J. Stager, Akron, OH (US); Neil R. Diener, Hudson, OH (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 13/177,816

(22) Filed: Jul. 7, 2011

(65) Prior Publication Data

US 2013/0012134 A1   Jan. 10, 2013

(51) Int. Cl.
*H04B 15/00* (2006.01)
(52) U.S. Cl.
USPC .................................................. 455/62
(58) Field of Classification Search
USPC ............. 455/562.1, 662.1, 452.2, 422.1, 501, 455/507, 509, 63.1, 62
See application file for complete search history.

(56) References Cited

U.S. PATENT DOCUMENTS

| | | | |
|---|---|---|---|
| 6,131,013 A * | 10/2000 | Bergstrom et al. | 455/63.1 |
| 6,683,913 B1 * | 1/2004 | Kantschuk | 375/258 |
| 6,714,605 B2 | 3/2004 | Sugar et al. | |
| 6,850,735 B2 | 2/2005 | Sugar et al. | |
| 6,941,110 B2 | 9/2005 | Kloper et al. | |
| 7,035,593 B2 | 4/2006 | Miller et al. | |
| 7,079,812 B2 | 7/2006 | Miller et al. | |
| 7,116,943 B2 | 10/2006 | Sugar et al. | |
| 7,171,161 B2 | 1/2007 | Miller | |
| 7,184,777 B2 | 2/2007 | Diener et al. | |
| 7,224,752 B2 | 5/2007 | Sugar et al. | |
| 7,254,191 B2 | 8/2007 | Sugar et al. | |
| 7,269,151 B2 | 9/2007 | Diener et al. | |
| 7,292,656 B2 | 11/2007 | Kloper et al. | |
| 7,315,564 B2 * | 1/2008 | McCorkle | 375/130 |
| 7,408,907 B2 | 8/2008 | Diener | |
| 7,424,268 B2 | 9/2008 | Diener et al. | |
| 7,450,673 B2 | 11/2008 | Jin et al. | |
| 7,606,335 B2 | 10/2009 | Kloper et al. | |
| 7,689,171 B2 * | 3/2010 | Li et al. | 455/63.1 |
| 7,801,239 B2 | 9/2010 | Jin et al. | |
| 7,924,957 B2 | 4/2011 | Jin | |
| 8,140,098 B2 * | 3/2012 | Gorokhov | 455/501 |
| 2005/0075077 A1 * | 4/2005 | Mach et al. | 455/67.13 |
| 2008/0039146 A1 | 2/2008 | Jin | |
| 2008/0299932 A1 * | 12/2008 | Belogolovy et al. | 455/296 |

* cited by examiner

*Primary Examiner* — Andrew Wendell
*Assistant Examiner* — Maryam Soltanzadeh
(74) *Attorney, Agent, or Firm* — Edell, Shapiro & Finnan, LLC

(57) ABSTRACT

At a wireless device operating in an unlicensed frequency band, energy received at a plurality of antennas is analyzed to detect interference on a channel in the unlicensed frequency band. The type of interference detected in the received energy is determined. Parameters are then generated for a nulling filter based on the type of interference detected in the received energy. The nulling filter is applied to the received energy at the plurality of antennas to produce a spatially filtered output. The spatially filtered output is evaluated to determine whether to send a transmission on the channel in the unlicensed frequency band.

19 Claims, 7 Drawing Sheets

DYNAMIC CLEAR CHANNEL ASSESSMENT USING SPECTRUM INTELLIGENT INTERFERENCE NULLING

TECHNICAL FIELD

The present disclosure relates to determining availability of a channel for sending a transmission in a communication network.

BACKGROUND

An unlicensed frequency band is used for wireless communication, such as a WiFi™ wireless local area network that operates in the 2.4 GHz band in the United States. Interference mitigation in a wireless network that operates in an unlicensed frequency is important due to the limited bandwidth and coexistence issues. For example, in addition to activity from WiFi networks, other devices that operate in the same unlicensed band include Bluetooth™ wireless devices, wireless video devices, etc. Non-WiFi activity in the unlicensed band can impair the performance of the wireless network operating in the same frequency band.

DESCRIPTION OF EXAMPLE EMBODIMENTS

Overview

At a wireless device operating in an unlicensed frequency band, energy received at a plurality of antennas of the wireless device is analyzed to detect interference on a channel in the unlicensed frequency band. The type of interference detected in the received energy is determined. Parameters are then generated for a nulling filter based on the type of interference detected in the received energy. The nulling filter is applied to the received energy at the plurality of antennas to produce a spatially filtered output. The spatially filtered output is evaluated to determine whether to send a transmission on the channel in the unlicensed frequency band.

Example Embodiments

Figure 1:
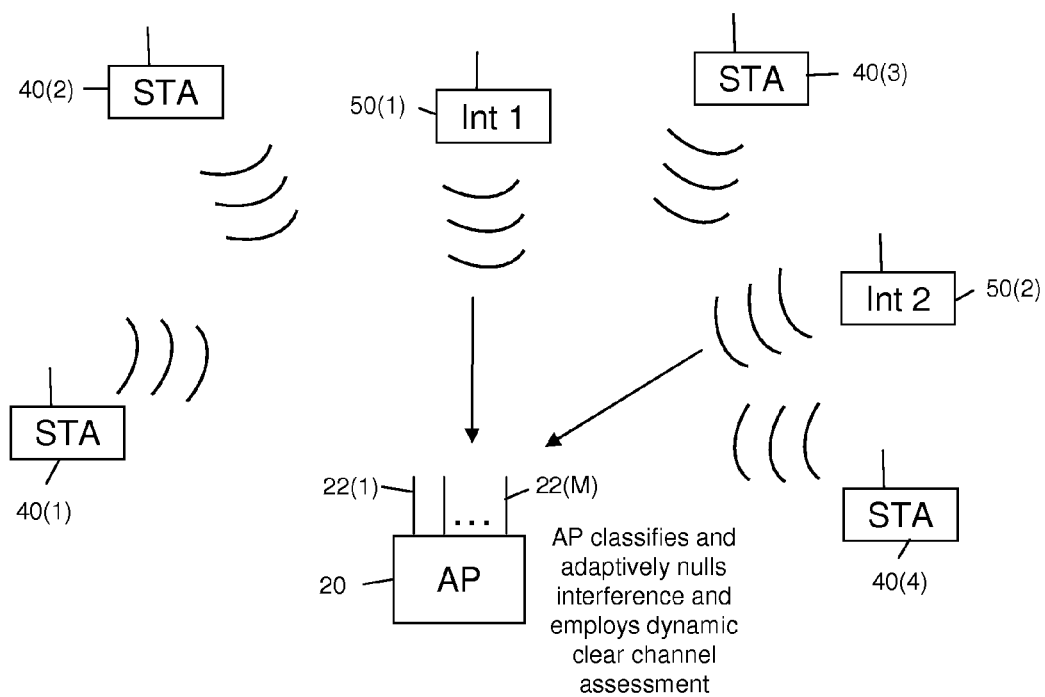
FIG. 1 is a diagram depicting an example of a wireless network operating in an unlicensed frequency band where interfering devices also operate, and in which a wireless access point is configured to classify and adaptively null out interference detected in received energy and employ dynamic clear channel assessment techniques.

Referring first to FIG. 1, a wireless communication network is shown generally at reference numeral 10, comprising a wireless access point (AP) 20 and a plurality of wireless stations (STAs) 40(1)-40(4). The AP may serve more than four STAs but for purposes of the examples described herein, FIG. 1 shows only four STAs. The AP 20 and STAs 40(1)-40(4) are configured to operate in accordance with a wireless network communication protocol or standard, such as the IEEE 802.11 wireless local area network (WLAN) communication protocol, e.g., a WiFi™ network. Another term for a STA in IEEE 802.11 parlance is a wireless client device or simply a "client."

Since an IEEE 802.11 WLAN operates in an unlicensed frequency band, e.g., the 2.4 GHz band in the United States, there is a strong likelihood that other devices that are configured to operate in the unlicensed frequency band may be active and interfere with the operation of the WLAN. To this end, FIG. 1 shows interference (Int) devices Int 1 at 50(1) and Int 2 at 50(2). Examples of such interference devices are those that operate in accordance with the Bluetooth™ wireless communication protocol, such as Bluetooth wireless headsets, wireless video communication devices (e.g., wireless video cameras). Other devices that can generate interference in the 2.4 GHz unlicensed band are microwave ovens.

Recent and next generation wireless networks in the unlicensed band use multiple-input multiple-output (MIMO) techniques to increase throughput and performance. A MIMO-capable wireless device has multiple antennas. Consequently, interference suppression (nulling) techniques can be used to suppress the interference from non-WiFi signals in the unlicensed band.

To this end, the AP 20 has a plurality of antennas 22(1)-22(M) and is configured to use MIMO wireless communication devices to improve throughput and performance when communicating with the STAs 40(1)-40(4). Consequently, when the AP 20 detects energy in the unlicensed band, it detects such energy separately on each of the plurality of antennas 22(1)-22(M). It can therefore obtain a spatial view of the received energy, and use receive signal processing techniques, such as spatial nulling, to improve receive signal processing performance with respect to signals the AP 20 receives.

According to the techniques described herein, the AP 20 is configured to detect interference, classify it (by type), and select appropriate interference nulling parameters based on the type of interference detected to null out the interference but maintain proper reception of desired signals, from one or more of the STAs 40(1)-40(4). The nulling operation is performed prior to supplying the received signals from the plurality of antennas 22(1)-22(M) to a baseband MIMO receiver so that the baseband MIMO receiver operates on a "cleaner" set of signals for better signal reception. Nulling is a spatial filtering operation in which the pass band is the complementary space (null space) of the interference.

Spectrum intelligence information is generated that indicates whether an interferer is present, the type of interferer detected, and optionally samples of the interferer, e.g., In-phase (I) and Quadrature-phase (Q) samples). Thus, the spectrum intelligence information may comprise {interferer present, type of interferer, I/Q samples of interferer}. This spectrum intelligence information is used to select appropriate nulling parameters (coefficients or weights) used by a receive spatial nulling filter to suppress the interference while having no impact on the desired receive signals. The nulling filter is applied to signals received across the plurality of antennas to spatially null out any detected interference. Moreover, using the output of the spatial filtering operation, knowledge about the type of detected interference, dynamic clear channel assessment (CCA) techniques are employed to account for spatial nulling and the type of detected interference. These dynamic CCA techniques incorporate both nulling gain and spectrum intelligence results to boost system capacity.

Receive interference nulling techniques can significantly mitigate the upstream interference level (generally >20 dB suppression). However, receive interference nulling does not change the interference level for downlink transmissions (from an AP to a client device). There are situations when the AP could interpret receive signal strength used for CCA purposes and make transmissions in a channel that cause substantial negative performance impact on an interfering device. For example, the interfering device could be a "friendly" device that is to be respected or it may be a "non-friendly" device, e.g., a non-WiFi device. Thus, the receive nulling interference suppression gain and characteristics of the interfering device are considered in the dynamic CCA scheme employed by the AP.

Figure 2:
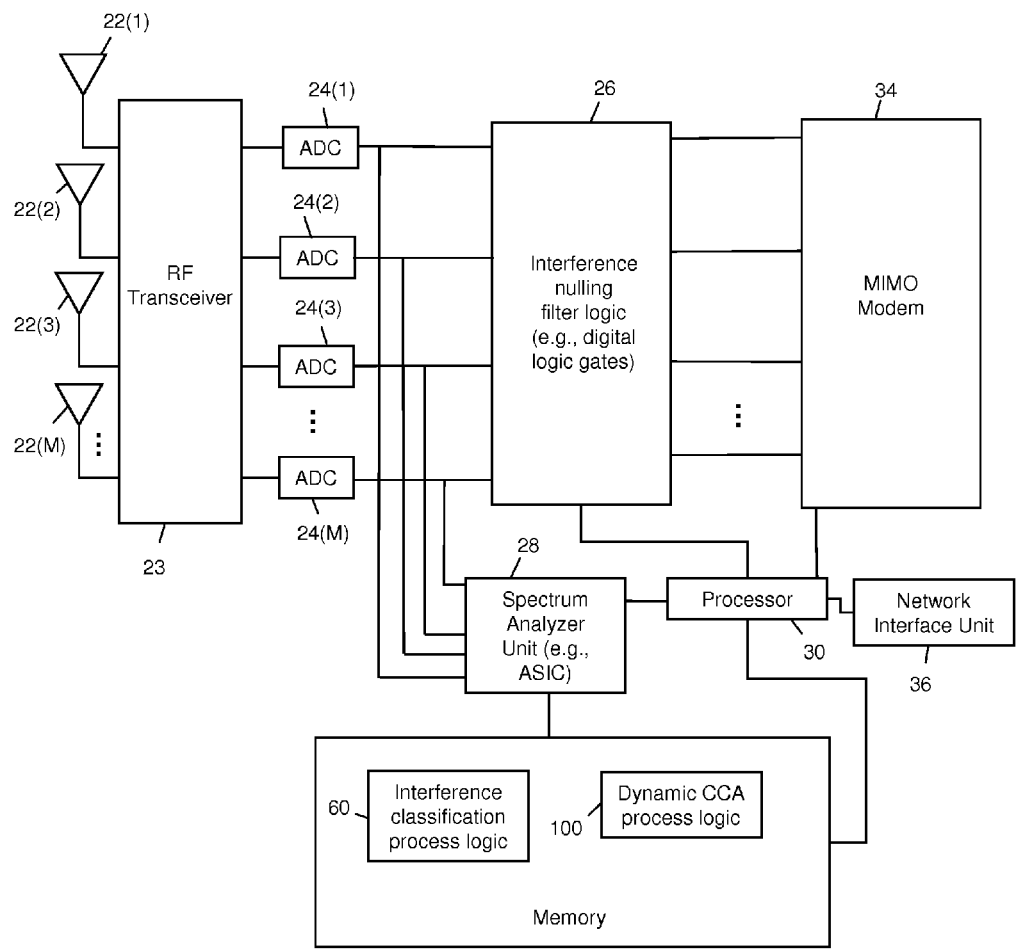
FIG. 2 is a block diagram showing an example of a wireless device, e.g., a wireless access point device, configured to perform the dynamic clear channel assessment techniques.

Reference is now made to FIG. 2 for a description of a block diagram of AP 20 that is configured to perform the spectrum intelligence-guided interference nulling and dynamic CCA threshold techniques. The AP comprises the plurality of antennas 22(1)-22(M), an RF transceiver 23, a plurality of analog-to-digital converters (ADCs) 24(1)-24(M), interference nulling filter logic 26, a spectrum analyzer unit 28, a processor 30, memory 32, a MIMO modem 34 and a network interface unit 36. The RF transceiver 23 comprises radio receiver circuitry to downconvert energy detected by the antennas 22(1)-22(M) and radio transmitter circuitry to upconvert antenna-specific signal to respective ones of the plurality of antennas 22(1)-22(M). The circuitry in the RF receiver 23 is not germane to the spectrum intelligence-guided interference nulling techniques and is therefore not shown and described in detail. The ADCs 24(1)-24(M) convert the downconverted analog signals from the respective antennas 22(1)-22(M) to antenna-specific digital signals. The antenna-specific digital signals output by the ADCs 24(1)-24(M) are supplied to the interference nulling filter logic 26 and to the spectrum analyzer unit 28. There are also a plurality of digital-to-analog converters (DACs) used to convert baseband antenna specific digital signals output by the MIMO modem 34 to the transmitter, but for simplicity the DACs are not shown in FIG. 2. As explained further hereinafter, the interference nulling filter logic 26 applies an interference nulling filter to the antenna-specific digital signals prior to processing by the MIMO modem 34. The MIMO modem 34 performs baseband processing and demodulating of the filtered signals output by the interference nulling filter logic 26 to recover data carried by those signals, as well as modulating of antenna-specific transmit signals to initiate a MIMO transmission using beamforming techniques, for example. The MIMO modem 34 may be an off-the-shelf WiFi MIMO baseband receiver chip or chipset, and the nulling filter operations are completely transparent to the operations of the MIMO modem 34, such as maximal ratio combining, demodulation, etc. The MIMO modem 34 may be configured to process orthogonal frequency division multiplexed (OFDM) baseband signals according to the IEEE 802.11n standard, for example. The network interface unit 36 enables connectivity, e.g., Ethernet connectivity, over a wired network so that the AP can communicate over a local area network and wide area network. In one form, the interference nulling filter logic 26 and spectrum analyzer unit 28 may be implemented by digital logic gates in one or more application specification integrated circuits (ASICs). In another form, the interference nulling filter logic 26 and spectrum analyzer unit 28 are implemented in software stored in memory 32 and executed by processor 30. The processor 30 is a microprocessor or microcontroller device, for example.

The parameters of the interference nulling filter logic 26 are determined based on the type of interference detected. To this end, the spectrum analyzer unit 28 receives the antenna-specific digital signals output by the ADCs 24(1)-24(M) and generates spectrum analysis data including characteristics of signal pulses (duration, center frequency, bandwidth, duty cycle) etc., as well as raw I and Q samples of received signals for a period of time. The processor 30 executes interference classification process logic 60 encoded or stored in memory 32 to classify and assign a type or name to any interference contained in received energy associated with the antenna-specific digital signals based on the spectrum analysis data output by the spectrum analyzer unit. For example, the spectrum analyzer unit 28 and interference classification process logic 60 may be implemented using the hardware and software capabilities found in the Cisco Spectrum Expert™ sensor devices or the CleanAir™ technology in the Cisco Aironet 3500 Series Access Point devices. In addition, other examples of the spectrum analyzer unit 38 and interference classification process logic 60 are described in U.S. Pat. Nos. 6,714,605; 7,254,191; 7,292,656; 6,850,735; 7,171,161; and 7,035,593. The processor 30 executes dynamic CCA process logic 100 to determine whether to initiate a transmission in the presence of detected energy on the channel based on output of the nulling filter and the type of interference detected by the interference classification process logic 60.

The memory 32 is a memory device and may comprise read only memory (ROM), random access memory (RAM), magnetic disk storage media devices, optical storage media devices, flash memory devices, electrical, optical, or other physical/tangible memory storage devices. Thus, in general, the memory 32 may comprise one or more computer readable storage media (e.g., a memory device) encoded with software comprising computer executable instructions and when the software is executed (by the processor 30) it is operable to perform the operations described herein in connection with process logic 100.

Figure 3:
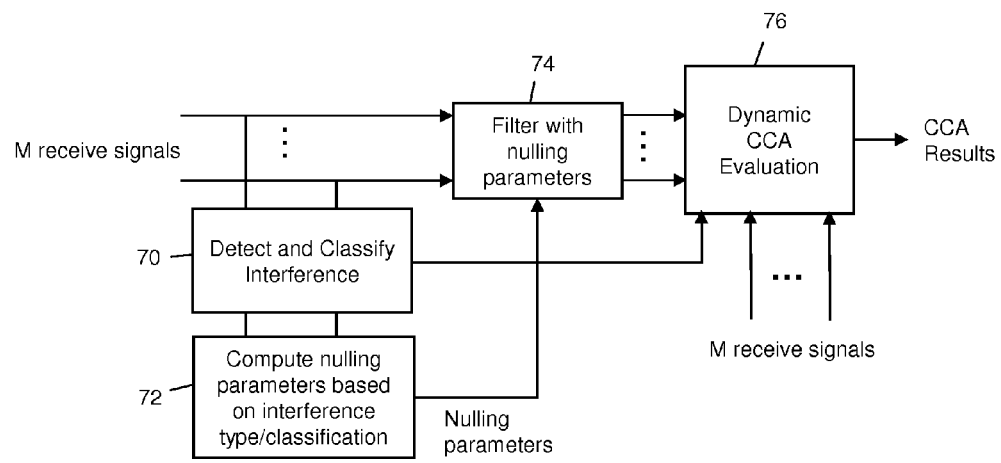
FIG. 3 is a diagram generally depicting operations of the wireless device in performing the dynamic clear channel assessment techniques.

Reference is now made to FIG. 3 for a description of a general flow of the operations associated with the spectrum intelligence-guided and nulling-based channel availability assessment process. M receive signals from M plurality of antennas on the AP are converted to digital signals and at 70, these signals are analyzed to detect and ultimately classify any detected interference. At 72, nulling parameters (e.g., nulling coefficients or weights) are computed or selected based on the type of interference detected. The nulling parameters are used at 74 to apply a nulling filter to the M received signals. The filtered signals (with any interference suppressed) are supplied for processing by the dynamic CCA evaluation at 76 to produce CCA results that are used to determine whether to a transmission can/should be sent on a channel in the unlicensed frequency band, assuming the AP has data to send to a particular client device. Thus, the inputs to the dynamic CCA evaluation at 76 include the filtered signals (after receive nulling), the received spatial signals without or prior to nulling and the interference classification results.

Figure 4:
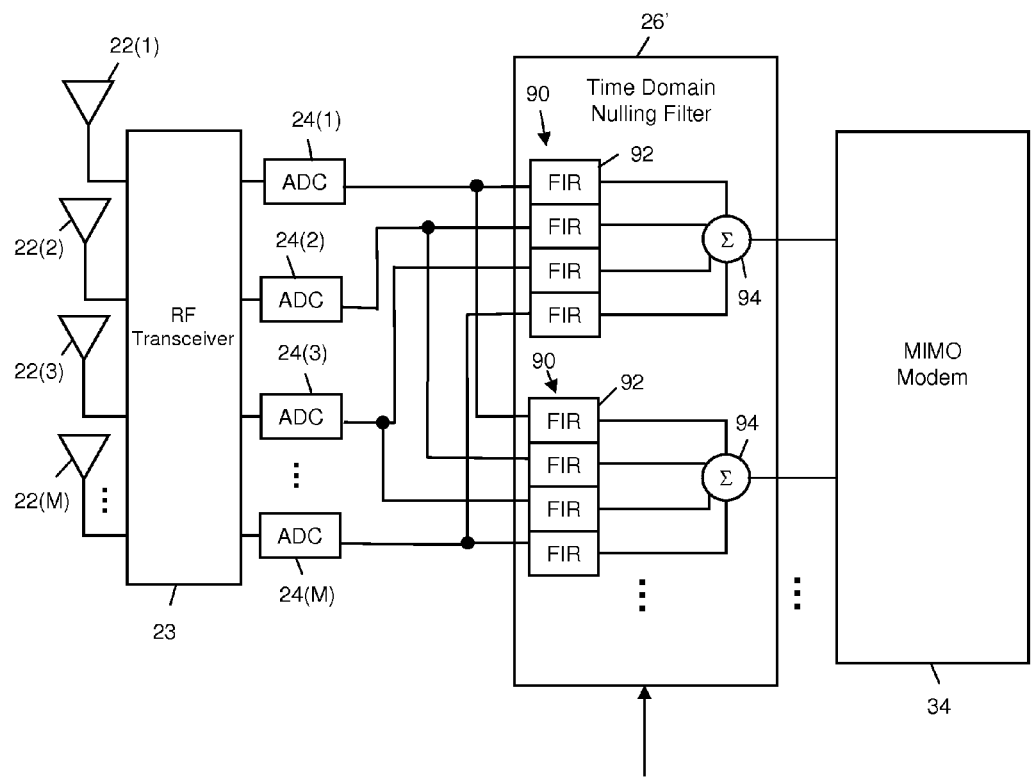
FIGS. 4 and 5 are block diagrams showing examples of configurations for adaptively nulling interference at the wireless device.

The interference nulling filter logic 26 may be implemented in the time domain or frequency domain. FIG. 4 illustrates an example of a configuration of time domain interference nulling filter logic 26'. Time domain interference nulling filter logic 26' comprises a plurality of finite impulse response (FIR) filter blocks 90(1)-90(M), one block for each antenna, and each block comprising M FIR filters 92. The outputs of the FIR filters within each filter block are added by a corresponding summer 94, and the output of the summer corresponds to a filtered output signal that is supplied to the MIMO modem 34. In this implementation of the nulling filter logic, the nulling parameters comprise tap weights or filter coefficients that define the impulse response of the FIR filters 92 in the respective filter blocks 92(1)-92(M). The outputs of the summers 94 may be converted to the frequency domain by Fast Fourier Transform (FFT) circuits (not shown).

Figure 5:
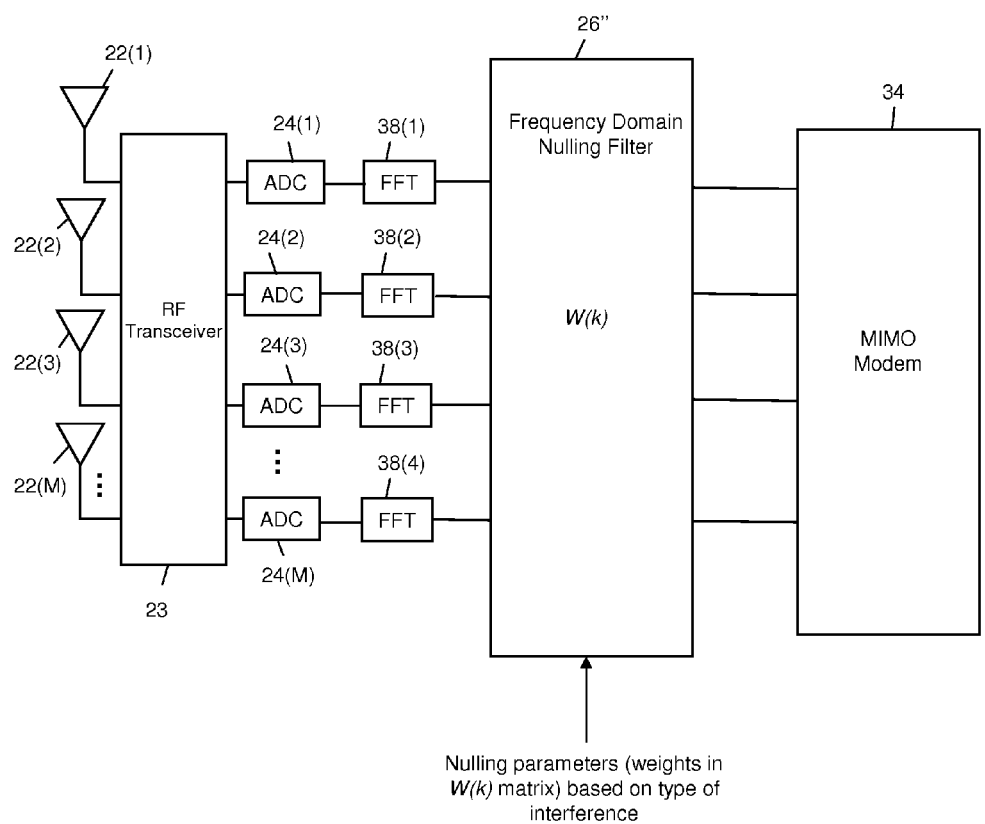

FIG. 5 illustrates an example of a configuration of frequency domain interference nulling filter logic 26". In this implementation, the outputs of the ADCs 24(1)-24(M) are supplied to FFT circuits 38(1)-38(M) to convert the antenna-specific digital signals to the frequency domain. The frequency domain interference nulling filter logic 26" applies an interference nulling matrix $W(k)$, where k is a frequency subcarrier index. The nulling parameters in this example consist of weights of the interference nulling matrix $W(k)$.

Figure 6:
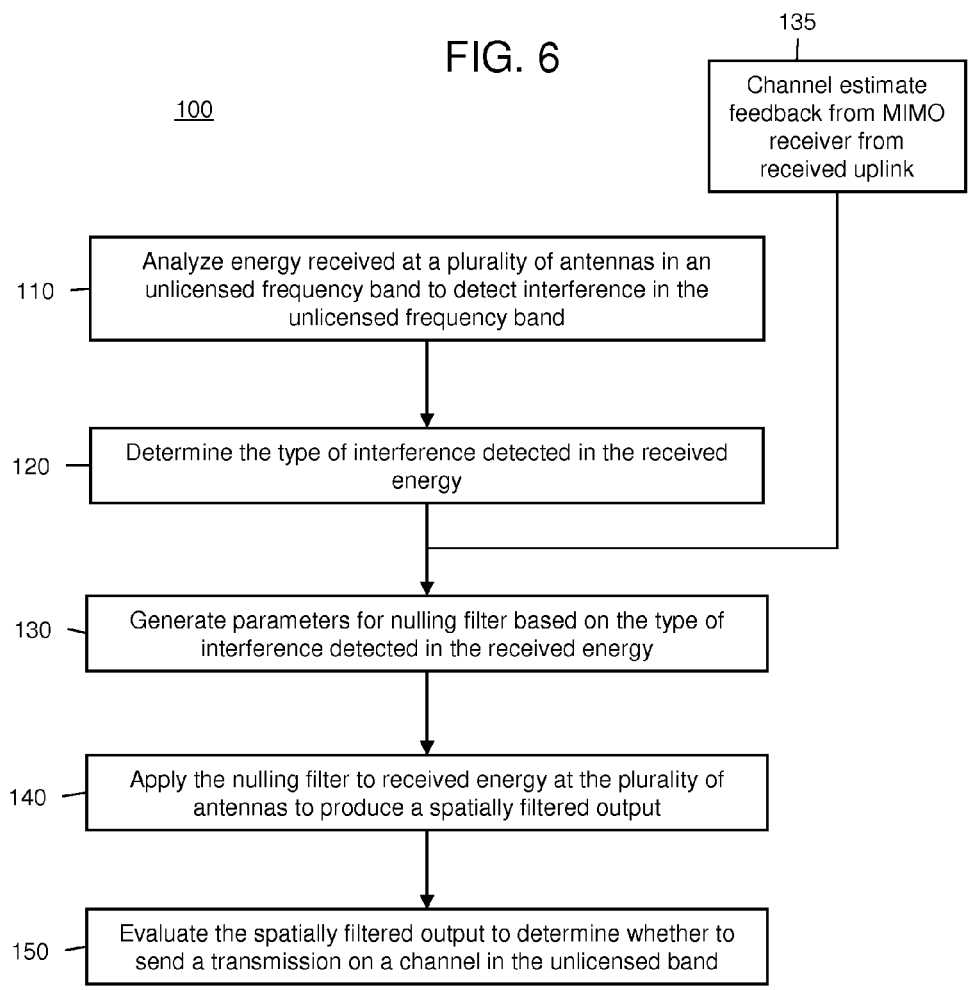
FIG. 6 is a flow chart illustrating examples of operations performed in the wireless device in performing the dynamic clear channel assessment techniques.

Reference is now made to FIG. 6 for a description of a flow chart that depicts operations of the AP 20 in the performing the dynamic CCA process logic 100. Some of the operations of the flow chart in FIG. 6 are operations with the interference classification process logic 60. The AP 20 receives energy on a channel in the unlicensed frequency band on its plurality of antennas 22(1)-22(M), and antenna-specific signals are downconverted and converted to digital signals, corresponding to the aforementioned antenna-specific digital signals. At 110, the AP analyzes energy received at its plurality of antennas to detect interference on a channel in the unlicensed frequency band. At 120, the spectrum analyzer unit 28 analyzes the antenna-specific digital signals to generate spectrum analysis data that is used by the interference classification process logic 60 to classify (determine the type of) the interference. The interference classification process logic 60 may generate a type or a name for a detected interferer, such as a Bluetooth headset, wireless video camera, Bluetooth data device, constant frequency interferer, etc. As is known in the art, a Bluetooth system includes a master unit and a slave unit that communicate using a frequency hopping scheme. When a frequency hopping interferer is detected, the monitoring and analyzing operation 120 may involve monitoring a plurality of frequencies in order to capture and analyze energy on all potential hop frequencies. By contrast, a wireless video camera operates on a fixed frequency. Thus, the type of interference detected can be used to adapt the nulling filter applied to null out that interference from desired signals.

At 130, based on the type of interference detected at 120, nulling filter parameters are generated/updated. The filter parameters may consist of coefficients/taps in the case of a time domain nulling filter (FIG. 4) or weights for a nulling filter matrix (FIG. 5). In addition, as shown at 135, channel estimation feedback from the MIMO modem 34 may be used in deriving the nulling filter parameters at 130. For example, the nulling filter parameters may be adjusted based on receive channel estimate information to take into consideration channel conditions for an outdoor line-of-sight (LOS) channel with potentially correlated channels along an azimuth angle or indoor channel conditions that are uncorrelated with wide angle-of-arrival (AoA) characteristics. The nulling filter parameters are loaded to the nulling filter process logic 26 prior to the receiving the next uplink frame.

Again, examples of types of interference are: frequency-hopping interference (e.g., a Bluetooth device), persistent interference transmissions (e.g., from wireless video devices) and WiFi-like interference (devices using the IEEE 802.11 wireless protocol). Different nulling filter parameters are computed for different interferer types. When the detected interferer is classified as a frequency-hopping device, a longer dwell is used for capturing received signals in all interfering frequencies in order to confirm that it is a persistent interference source and not interference that has come and gone on a channel. The interference cancellation weights need to be calculated from data received over time and across a plurality of frequencies, and the superposition of multiple interference information captures (across time and frequency) are used to calculate the nulling interference weight matrix for frequency hopping interference. When the detected interferer is classified as a microwave oven, then it is known that the interference is stationary and primarily will occur at fixed times during the day. As a result, the interference nulling can be applied at fixed times during the day. Moreover, the latest reliable interference capture may be used for computing the interference nulling matrix for a persistent interferer.

Generally, different interference nulling algorithms will converge more accurately and quickly when applied to the correct type of signals. For example, a constant modulus beamformer/nulling filter matrix should be applied to constant modulus interferers (e.g., microwave ovens, wireless video signals, etc.). Furthermore, classification can be used to separate multiple sources of interference in order to apply different nulling filters to each interferer and/or to identify the worst type interferer in order to generate parameters for a nulling filter to null out the worst interferer among a plurality of detected interferers.

Operations 110-130 may be performed for energy received by the AP during inter-frame intervals when it is expected that there are no transmissions occurring in the WLAN. Therefore, the spectrum analysis and interference classification operations are performed on data derived from energy that could not be energy from WLAN transmissions associated with the AP or its STAs. In other words, the interference characterization may be based on energy received between WLAN packets, e.g., IEEE 802.11 packets, to set the parameters of the nulling filter to be used on received IEEE 802.11 packets.

The rank of the nulling filter, in the case of a frequency domain nulling filter as depicted in FIG. 5, may be reduced to be less than the number of receive antennas, i.e., M−1, to avoid a 'keyhole' channel effect on the desired signals. The keyhole effect occurs when the MIMO channel capacity is low (i.e., comparable to the single-input single-output (SISO) capacity) even though the signals at the antenna elements are uncorrelated. This is related to scenarios where scattering around the transmitter and receiver lead to low correlation of the signals. In addition, the rank of the nulling filter can be reduced to simplify the hardware implementation, if desired or necessary.

At 140, the nulling filter, with the filter parameters updated and loaded at 130, is applied to the received signals from the plurality of antennas for the received frame to null out any interference contained in the received signals yet leave in tact the desired receive signals, i.e., a received uplink frame from one of the STAs. The nulling filter is a receive spatial filter that creates an antenna null in the direction of the interference since the interference is evaluated across multiple antennas of the AP. The nulling filter passes desired signals, e.g., IEEE 802.11 WLAN signals, while reducing the receive power of a targeted interferer by 20-30 dB. When reducing the interferer receive power by 20-30 dB, the nulling filter has no impact on the desired signals because the AP/client channel and AP/interferer channel are uncorrelated.

At 150, the spatially filtered output is evaluated to determine whether to send a transmission on the channel in the unlicensed band, that is, whether the channel is "free" or available to send a transmission. Generally, the evaluation made at 150 involves comparing a level (receive signal strength) of the spatial filtered output with a threshold, e.g., a CCA threshold, such that the AP refrains from sending a transmission in the channel when the level of the spatially filtered output signal is greater than the threshold. Thus, rather than using solely the unfiltered received signals to determine whether or not the channel is free or available, the receive signal strength level (of the receive energy filtered with a nulling filter that is tuned/adjusted according to the type of detected interference) is compared against a CCA threshold, for example, before sending a transmission on the channel when data is available at the AP to send on the channel.

Figure 7:
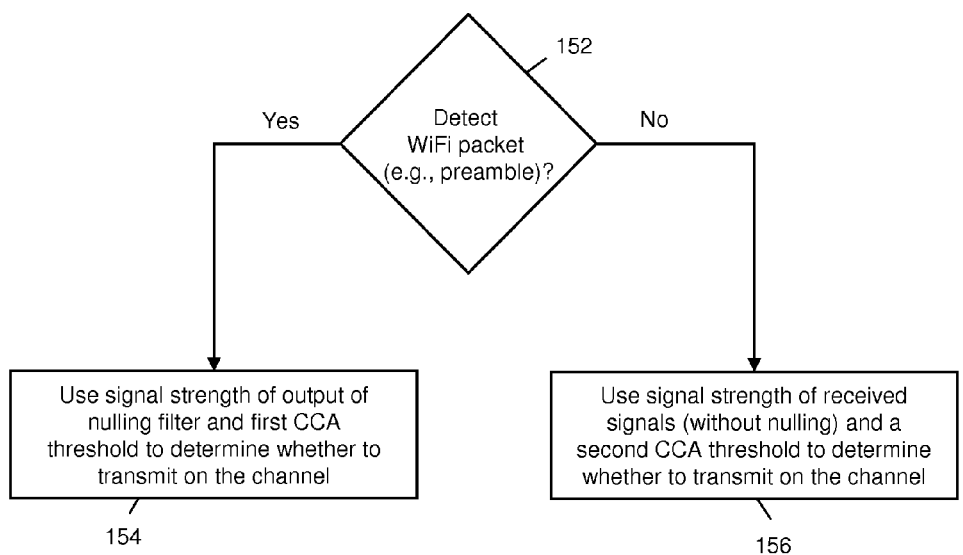
FIG. 7 is a flow chart illustrating more detailed examples of operations of the dynamic clear channel assessment techniques.

FIG. 7 illustrates examples of operations performed at 150 in FIG. 6 to determine whether to send a transmission based on the spatially filtered output of the nulling filter, the interference type, the received signals (unfiltered by the nulling filter) and whether a WiFi packet preamble, is present. At 152, it is determined whether there is a WiFi packet preamble in the output of the nulling filter (referred to herein as $y_{null}$) and the unfiltered received signals (referred to herein as $y_{no}$). When at 152, it is determined that a WiFi packet (e.g., preamble) is present in $y_{null}$ and/or $y_{no}$, then at 154, the signal strength of $y_{null}$ is compared against a first CCA threshold used for a situation where the nulling filtered would not normally be used. For example, the first CCA threshold is −82 dBm. On the other hand, when at 152, it is determined that a WiFi packet preamble is not present in the received energy after nulling and/or prior to nulling, then at 156, the signal strength of the received signal without nulling, $y_{no}$, is compared to a second CCA threshold. In one example, the second CCA threshold is set to a value corresponding to an energy detect threshold β without considering any receive nulling gain when the signal classification results indicate presence of interference from a so-called "friendly" device. A "friendly" device is a non-WiFi device that, based on a predetermined policy, the AP wishes to respect and not transmit over. For example, the second CCA threshold is set to −62 dBm. When the signal classification results indicate that there is no interference from a "friendly" device, then the second CCA threshold is set to a value equal to the energy detect threshold without considering receive nulling gain, β, plus an additional value G, calculated from the receive nulling gain. Thus, the value G corresponds to a level corresponding to a difference between the received signals prior to nulling, $y_{no}$, and after nulling, $y_{null}$.

There are several ways to calculate the value of G. In one example, it is calculated from the average signal level difference between $y_{null}$ and $y_{no}$. For example, one computation for G is:

$G=\{10\times\log 10(abs(y_{no}(1)/y_{null}(1))^{\wedge}2)+10\times\log 10(abs(y_{no}(2)/y_{null}(2))^{\wedge}2)+\ldots +10\times\log 10(abs(y_{no}(N)/y_{null}(N))^{\wedge}2)\}/N$, where $y_{null}$ and $y_{no}$ are defined above. The ( ) indicates the index for samples of $y_{null}$ and $y_{no}$. For example, $Y_{null}(1)$ is a first sample of nulling filter output, $Y_{null}(2)$ is a second sample of the nulling filter output, and so on. This equation for computing G estimates how many dB the interference is reduced by the nulling filter and the ratio is averaged over several samples.

Another method for computing G is one that is based on a sliding window and is updated whenever new symbols are received:

$G=\rho\times G+(1-\rho)\times\log 10(abs(y_{no}/Y_{null})^{\wedge}2)$, where ρ is a factor that takes a value between 0 and 1.

Thus, in summary, FIG. 7 illustrates that the evaluating operation involves evaluating the received energy prior to applying the nulling filter, the spatially filtered output of the nulling filter, and the type of interference detected in the received energy. When it is determined that the received energy contains a wireless network transmission (e.g., a WiFi packet), a level (receive signal strength) of the spatially filtered output is compared with a first threshold. When it is determined that the received energy does not contain a wireless network transmission, a level (received signal strength) of the received energy prior to applying the nulling filter is compared with a second threshold. The second threshold is set to a first value when the type of the interference is a first type (e.g., a friendly type), and is set to a second value when the type of the interference is not a friendly type.

The dynamic CCA techniques described herein take into account a gain from receive nulling and spectrum intelligence (signal classification results). The downlink transmission decision is adaptively adjusted based on receive nulling gain and characteristics of the detected/classified interference. Moreover, these techniques selectively adjust a CCA response for the specific interference, and yet still are "friendly" to other WiFi transmissions.

The above description is intended by way of example only. Various modifications and structural changes may be made therein without departing from the scope of the concepts described herein and within the scope and range of equivalents of the claims.

What is claimed is:

1. A method comprising:
   at a wireless device, analyzing energy received at a plurality of antennas in an unlicensed frequency band to detect interference on a channel in the unlicensed frequency band;
   determining the type of interference detected in the received energy;
   generating parameters for a spatial nulling filter based on the type of interference detected in the received energy;
   applying the spatial nulling filter to received energy at the plurality of antennas to spatially suppress interference in the received energy and produce a spatially filtered output;
   determining whether the received energy contains a wireless network transmission;
   comparing a level of the spatially filtered output with a first threshold when it is determined that the received energy contains a wireless network transmission; and
   evaluating the spatially filtered output to determine whether to send a transmission on the channel in the unlicensed frequency band.

2. The method of claim 1, wherein comparing comprises comparing the level of the spatially filtered output with a clear channel assessment threshold.

3. The method of claim 1, and further comprising refraining from sending the transmission in the channel when the level of the spatially filtered output is greater than the first threshold.

4. The method of claim 1, wherein evaluating comprises evaluating the received energy prior to applying the spatial nulling filter, evaluating the spatially filtered output and evaluating the type of interference detected in the received energy.

5. The method of claim 1, wherein when it is determined that the received energy does not contain a wireless network transmission, evaluating comprises comparing a level of the received energy prior to applying the spatial nulling filter with a second threshold.

6. The method of claim 5 and further comprising setting the second threshold to a first value when the type of interference is a first type, and setting the second threshold to a second value when the type of interference is a type other than the first type.

7. The method of claim 6, wherein setting comprises setting the second threshold to the first value which is based on an energy detect threshold without considering any gain associated with the spatial nulling filter, and setting the second threshold to a second value which is based on a sum of the first value and a difference between the received energy prior to applying the spatial nulling filter and a spatially filtered output.

8. An apparatus comprising:
a plurality of antennas;
a radio receiver coupled to the plurality of antennas and configured to downconvert signals detected by the plurality of antennas in an unlicensed frequency band;
a radio transmitter configured to transmit signals via at least one of the plurality of antennas;
a spectrum analyzer unit configured to analyze signals output by the radio receiver for at least one antenna to detect interference in the unlicensed frequency band; and
a processor coupled to the radio receiver, spectrum analyzer unit and radio transmitter, and configured to:
analyze energy received at a plurality of antennas to determine the type of interference detected in the received energy;
generate parameters for a spatial nulling filter based on the type of interference in the received energy;
apply the spatial nulling filter to received energy at the plurality of antennas to spatially suppress interference in the received energy and produce a spatially filtered output;
determine whether the received energy contains a wireless network transmission;
compare a level of the spatially filtered output with a first threshold when it is determined that the received energy contains a wireless network transmission; and
evaluate the spatially filtered output to determine whether to send a transmission on the channel in the unlicensed frequency band.

9. The apparatus of claim 8, wherein the processor is configured to refrain from sending the transmission in the channel when the level of the spatially filtered output is greater than the first threshold.

10. The apparatus of claim 9, wherein the processor is configured to evaluate by evaluating the received energy prior to applying the spatial nulling filter, evaluating the spatially filtered output and evaluating the type of interference detected in the received energy.

11. The apparatus of claim 8, wherein the processor is configured to compare a level of the received energy with a second threshold prior to applying the spatial nulling filter, when it is determined that the received energy does not contain a wireless network transmission.

12. The apparatus of claim 11, wherein the processor is configured to set the second threshold to a first value when the type of interference is a first type, and setting the second threshold to a second value when the type of interference is a type other than the first type.

13. One or more computer readable non-transitory storage media encoded with software comprising computer executable instructions and when the software is executed operable to:
analyze energy received at a plurality of antennas of a wireless device to detect interference on a channel in an unlicensed frequency band;
determine the type of interference detected in the received energy;
generate parameters for a spatial nulling filter based on the type of interference in the received energy;
apply the spatial nulling filter to received energy at the plurality of antennas to spatially suppress interference in the received energy and produce a spatially filtered output;
determine whether the received energy contains a wireless network transmission;
compare a level of the spatially filtered output with a first threshold when it is determined that the received energy contains a wireless network transmission; and
evaluate the spatially filtered output to determine whether to send a transmission on the channel in the unlicensed frequency band.

14. The computer readable non-transitory storage media of claim 13, wherein the instructions that are operable to evaluate comprise instructions that are operable to refrain from sending the transmission in the channel when the level of the spatially filtered output is greater than the first threshold.

15. The computer readable non-transitory storage media of claim 14, wherein the instructions that are operable to evaluate comprise instructions that are operable to evaluate the received energy prior to applying the spatial nulling filter, evaluate the spatially filtered output and evaluate the type of interference detected in the received energy.

16. The computer readable non-transitory storage media of claim 13, wherein the instructions that are operable to evaluate comprise instructions that are operable to compare a level of the received energy with a second threshold prior to applying the spatial nulling filter when it is determined that the received energy does not contain a wireless network transmission.

17. The apparatus of claim 12, wherein the processor is configured to set the second threshold to the first value which is based on an energy detect threshold without considering any gain associated with the spatial nulling filter, and set the second threshold to a second value which is based on a sum of the first value and a difference between the received energy prior to applying the spatial nulling filter and a spatially filtered output.

18. The computer readable non-transitory storage media of claim 16, wherein the instructions that are operable to evaluate comprise instructions that are operable to set the second threshold to a first value when the type of interference is a first type, and set the second threshold to a second value when the type of interference is a type other than the first type.

19. The computer readable non-transitory storage media of claim 18, wherein the instructions that are operable to evaluate comprise instructions that are operable to set the second threshold to the first value which is based on an energy detect threshold without considering any gain associated with the spatial nulling filter, and set the second threshold to a second value which is based on a sum of the first value and a difference between the received energy prior to applying the spatial nulling filter and a spatially filtered output.

* * * * *